June 8, 1965  R. H. EISENGREIN ETAL  3,187,599
TORQUE AMPLIFIER
Filed June 5, 1963  2 Sheets-Sheet 1

INVENTORS
ROBERT H. EISENGREIN
FRANCIS O. BLACKWELL III
BY

ATTORNEYS

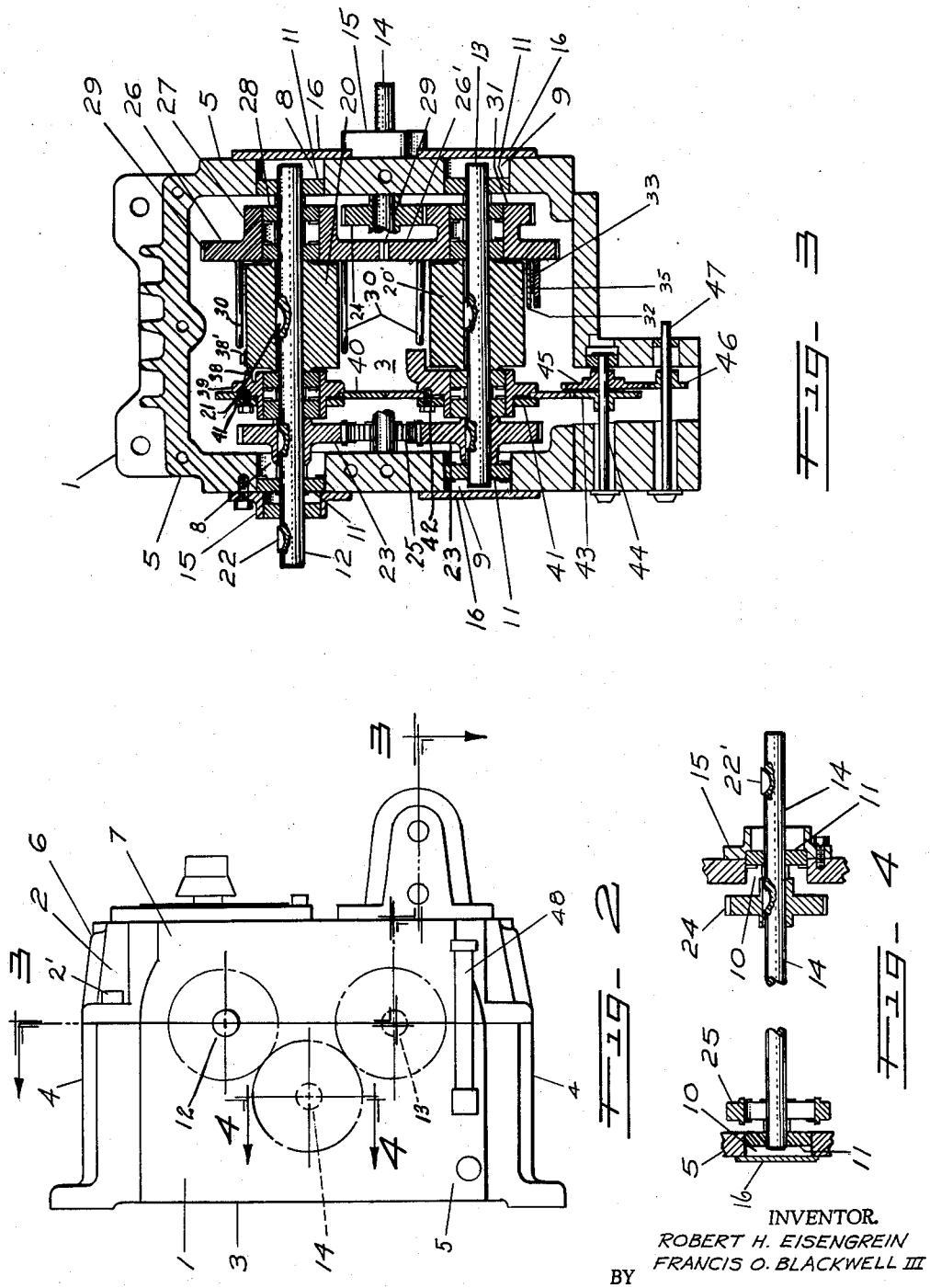

United States Patent Office 3,187,599
Patented June 8, 1965

3,187,599
TORQUE AMPLIFIER
Robert H. Eisengrein, Skaneateles, and Francis O. Blackwell III, Seneca Falls, N.Y., assignors to Seneca Falls Machine Company, Seneca Falls, N.Y.
Filed June 5, 1963, Ser. No. 285,683
13 Claims. (Cl. 74—388)

This invention relates to a new and useful torque amplifying device for selective transmission of a relatively large power force from an input shaft, which can be continuously rotated in one direction to an output shaft, to rotate the same in either direction, all under the control of a relatively small control force.

The primary object of this invention is to provide such a device in a relatively economical construction which is extremely durable and dependable in operation.

Another object of this invention is to provide a torque amplifying device having a band and drum clutch assembly with improved means for setting and adjusting the normal clearance therebetween.

In one aspect thereof, a torque amplifier constructed in accordance with our invention is characterized by the provision of input, output and drum shafts, a drum mounted on each of the input and drum shafts for rotation therewith, input gears mounted on the input and drum shafts for rotation therewith, an idler gear rotatable on the output shaft and engaging the input gears whereby the drums are rotated in the same direction, intermeshing transmission gears rotatable on the input and drum shafts, a band associated with each drum for engagement therewith, each band being connected to the associated transmission gear, intermeshing band tightening gears rotatable on the input shaft and the drum shaft and each connected to the associated band, an output gear mounted on the output shaft for rotation therewith and connected to one of the transmission gears for being rotated thereby, and means including a control gear engaging one of the band tightening gears for alternative tightening of the bands on the associated drums thereby causing rotation of the output shaft in a coordinated direction.

In still another aspect thereof, a torque amplifier constructed in accordance with this invention is characterized by the provision of a drum shaft and means for rotating the same, a drum rotatable with the drum shaft, an output shaft, a transmission gear rotatable on the drum shaft and connected to the output shaft for rotating the same, a band engageable with the drum and connected at one end to the transmission gear, a band tightening gear mounted on a hub rotatable on the drum shaft, the hub being connected to the other end of the band and being rotatable relative to the band tightening gear thereby to vary the clearance between the band and the drum, means carried by the hub for releasably securing the band tightening gear in selected rotary position thereon, and control means for rotating the band tightening gear to tighten the band against the drum and thereby cause rotation of the output shaft.

In another aspect thereof, a torque amplifier constructed in accordance with this invention is characterized by the provision of a drum shaft and means for rotating the same, a drum rotatable with the drum shaft, an output shaft, a transmission gear rotatable on the drum shaft and operatively connected to the output shaft for rotating the same, a band engageable with the drum and connected at one end to the transmission gear, a band tightening gear rotatable on the drum shaft and connected to the other end of the band, and control means operable to rotate the band tightening gear to tighten the band against the drum and thereby cause rotation of the output shaft, one of the band ends having a swivel connection to the associated gear.

The foregoing and other objects, advantages and characterizing features of our invention will become clearly apparent from the ensuing detailed description of an illustrative, presently preferred embodiment thereof, taken in conjunction with the accompanying drawings depicting the same wherein like reference numerals denote like parts throughout the various views and wherein:

FIG. 2 is an end elevational view thereof, on a reduced scale;

FIG. 3 is a sectional view thereof, taken about on line 3—3 of FIG. 2 with the tightening bands omitted for clarity and ease of illustration; and FIG. 4 is a sectional view thereof taken about on line 4—4 of FIG. 2, parts being broken away for ease of illustration.

Figure 1:
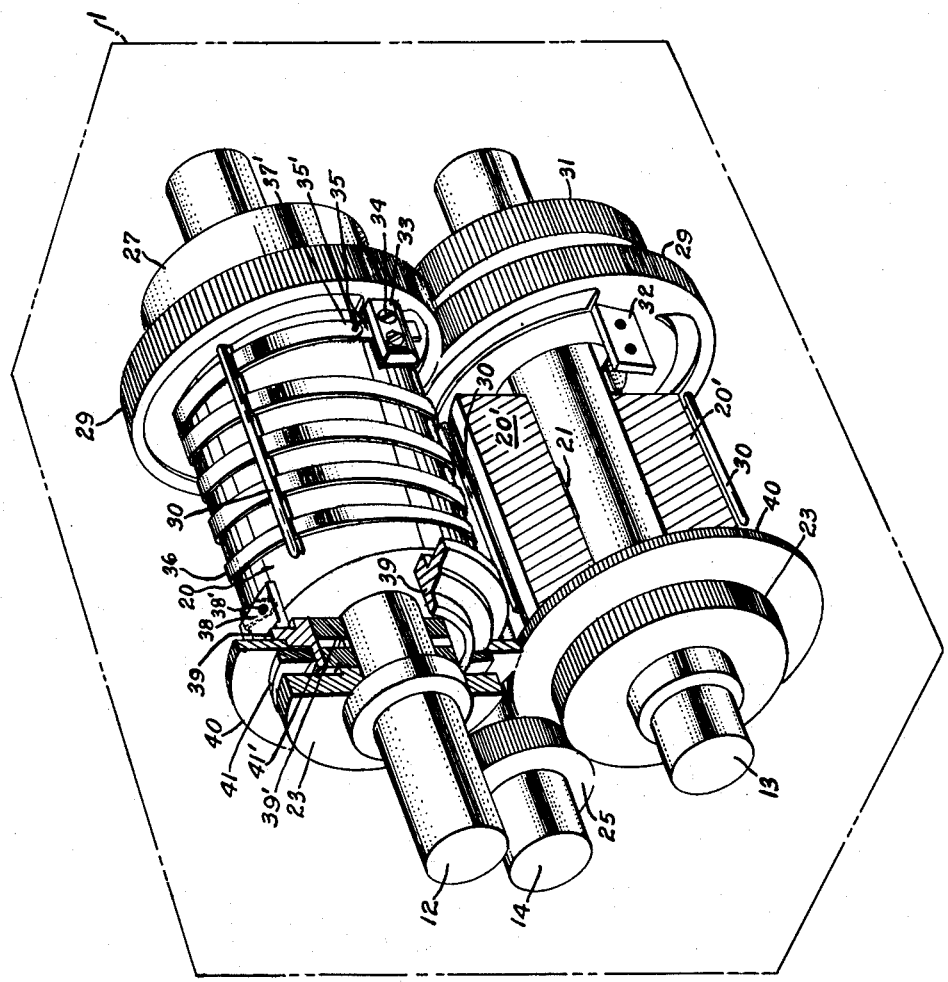
FIG. 1 is a somewhat schematic, perspective view of a torque amplifier of our invention, certain parts being omitted and others being shown in section for clarity and ease of illustration.

Turning now to the illustrative embodiment of our invention depicted in the accompanying drawings, there is shown a housing comprising a lower part 1 and an upper part 2, held together by screws 2' or other desired means. Lower housing part 1 has a bottom wall 3, end walls 4 and side walls 5, and upper housing part 2 has end walls 6 and opposed side walls 7.

The side walls 5 and 7 of housing parts 1 and 2, respectively, are bored to conjointly provide aligned openings 8, 8 and 9, 9 therethrough, and the side walls 5 of housing part 1 also are bored to provide aligned openings 10, 10 therethrough (FIG. 4). Openings 8, 8 receive a pair of bearings 11 which journal an input power shaft 12 projecting outwardly beyond one side of the housing. A pair of bearings 11 are carried in openings 9, 9, and journal a drum shaft 13. An output power shaft 14 is journalled in another pair of bearings 11, mounted in the openings 10, 10, and projects outwardly beyond the opposite side wall of the housing.

Bearings 11 are conventional and identical. Openings 8, 8, 9, 9 and 10, 10 are of the same diameter, and the same is true of shafts 12, 13 and 14. Further, shafts 12 and 14 are identical throughout, but turned around so that one extends through and beyond one side wall of the housing while the other extends through and beyond the opposite side wall thereof. Thus, boring is simplified and this, together with the identity of parts characteristic of an amplifier of our design, materially contributes to its relatively low cost.

The bearings 11 at the projecting ends of shafts 12 and 14 are held in position by retainers 15. The other openings 8, 9, 9 and 10 are closed by covers 16.

A pair of drums 20, 20', of identical construction, are keyed at 21 to input shaft 12 and drum shaft 13, respectively, for rotation therewith. Input shaft 12 also has a key 22 for attachment to a suitable rotary power source, not shown, and is adapted to be continuously rotated in the same direction. In like manner, output shaft 14 carries a key 22' (FIG. 4) for attachment to a driven rotating member, not illustrated, whereby shaft 14 constitutes a power output shaft. However, shaft 14 is only intermittently rotated, in either direction, by input shaft 12 under control of a pilot mechanism more fully described hereafter.

A pair of identical input gears 23 are keyed to input shaft 12 and drum shaft 13, respectively, for rotation therewith, and a like gear 24 constitutes an output gear keyed to output shaft 14 for rotation therewith. Output shaft 14 also carries an idler gear 25, rotatable thereon, which meshes with input gears 23 whereby drums 20 and 20' are continuously rotated, in the same direction, by input shaft 12.

An output gear spider 26 has a hub 27 which is journalled on input shaft 12 by bearings 28. A transmission gear 29 comprises part of spider 26, and a pair of pins 30 extend from hub 27 in the direction of shaft 12 in outwardly spaced relation to drum 20 on diametrically opposite sides thereof. A second, similar output gear spider 26' is journalled on drum shaft 13 and has, in addition to a transmission gear 29 engaged with transmission gear 29 of spider 26, a further transmission gear 31 which meshes with output gear 24. Spider 26' also has a pair of pins 30, which limit the loosening, expansion of the associated bands 36.

Each spider 26, 26' has a flattened finger 32 extending axially inwardly from hub 27 in radially spaced relation to the associated drum, and adapted to receive a clamping member 33 thereagainst. The clamping members 33 are releasably secured to fingers 32 as by paired screws 34 adapted to receive therebetween a swivel tab 35 for a band 36. Bands 36 loosely encircle the associated drums 20, 20', and are wound spirally therearound, the bands being wound in the same direction and being tapered from one end to the other to facilitate such winding. One end 37 of each band 36 is secured as by a screw 38' to a finger 38 extending from an input hub 39 in the direction of the drum axis. Hubs 39 are journaled on shafts 12 and 13 by suitable bearings 39', and each carries a band tightening control gear 40 rotatable thereon. Gears 40 intermesh, and are held against rotation on their respective hubs 39 by releasable clamping rings 41 axially slidable on hub flanges 41' and secured to hubs 39 by screws 42 (FIG. 3).

Further, it is a feature of our invention that the other ends 37' are swivelled, at 35', on tabs 35, for rotation about an axis normal to the band end and limited rocking about the lengthwise axis of the band end. This enables the bands to accommodate tightening and loosening relative to the drums, for a smoother and more uniform gripping action and for longer band life. The swivel 35' can comprise, for example, a rivet or pin loosely engaged in a hole in end 37'.

One of the band tightening gears 40 meshes with a control gear 43 carried by a shaft 44 for rotation therewith. Shaft 44 carries another gear 45 meshing with a gear 46 on a shaft 47 adapted to be connected to a pilot motor or any suitable control device adapted to rotate shaft 47 in opposite directions.

When inoperative, bands 36 are disengaged from the continuously rotating drums 20, 20' and output shaft 14 is stationary even while input shaft 12 is rotating. However, if it is desired to rotate output shaft 14 from input shaft 12, a rotary control input motion is applied to shaft 47, and through gears 46 and 45, shaft 44 and gear 43 to the band tightening gears 40. Rotation of the band tightening gears in one relative direction will cause one of the bands 36 to be wound and thereby tightened against its drum, while the other band 36 is further unwound and loosened relative to its drum. The tightened band 36 and its drum then function as a friction clutch, connecting the associated transmission gear spider 26 or 26' to the rotating drum. Rotation of either gear spider 26, 26' causes a rotation of the other, and consequently rotates the output transmission gear 31 which, through engagement with output gear 24, causes rotation of shaft 14 in one direction or the other, depending upon which band 36 is tightened against its drum.

Once the rotary control input stops, transmission of power to output shaft 14 is interrupted, because further rotation of the output gear spider 26 or 26' will cause it to loosen the previously tightened band. Output shaft 14 therefore stops in adjusted position. In this way, a very small control force, just sufficient to tighten bands 36, can control the transmission of a very large power input to the output shaft 14. Further, by reversing the direction of the rotary control force, the direction of rotation of output shaft 14 will be reversed. All of this can be accomplished with a continuously rotating input shaft. The control force can be supplied by any desired means, including by way of example, without limitation, the pilot control mechanisms disclosed in the Small Patents 2,569,585, 2,569,586 and 2,585,507.

It has been customary to provide bands such as those shown at 36 with a cork or other friction producing surface, to provide the necessary frictional engagement with the drum. That can be done with the amplifier of our invention. However, in the illustrated arrangement the bands 36, which are of spring metal, directly engage the surface of the metal drums 20 and 20', with a suitable lubricant provided between these surfaces. The band engaging surfaces of the drums must be lubricated, or the bands will simply grab the drum surfaces instead of smoothly engaging the same. To this end, housing 1 will contain lubricating fluid in a quantity sufficient to lubricate the band engaging surfaces of the drums. A lubricant depth indicator 48 preferably is provided.

Further in accordance with our invention, means for initially adjusting the clearance between the bands and drums, and for adjusting this clearance during use, are provided. Such means comprise the clamping members 33 engaging one end of the bands, and the relatively rotatable band tightening gears 40 on their hubs 39.

Clamping members 33 provide a relatively coarse initial adjustment. They are simply loosened, to permit the swivel tab 35 of the associated band to be moved relative to the clamp. The tab is then clamped in adjusted position.

The relative rotation between hub 39 and gear 40 provides a very fine adjustment, because these two parts can be relatively rotated to an infinite number of positions. Further, this adjustment can be made even after gears 40 are engaged, with each other and with the control gear 43, by simply loosening clamping rings 41 and then rotating the hub 39 relative to its gear 40. In other words, this adjustment can be made after assembly of these parts.

Accordingly, it is seen that our invention fully accomplishes its intended objects. The use of identical through bores and of shafts and gears which are identical in many instances, reduces the number of different parts which must be used and thereby simplifies the construction of the unit. Adjustment of initial clearance is easily provided, even after assembly, by means also enabling adjustment during use.

While we have disclosed in detail only one embodiment, that has been done by way of illustration only and without throught of limitation. Variations and modifications will occur to those skilled in the art, without departing from the spirit of our invention, and it is intended to include the same within the scope of the appended claims.

Having fully disclosed and completely described our invention, together with its mode of operation, what we claim as new is:

1. A torque amplifier comprising, an input power shaft, an output power shaft, a drum shaft, a drum mounted on said input shaft for rotation therewith, a drum mounted on said drum shaft for rotation therewith, input gears mounted on said input shaft and said drum shaft for rotation therewith, an idler gear rotatable on said output shaft and engaging said input gears whereby said drums are rotated in the same direction, intermeshing transmission gears rotatable on said input shaft and said drum shaft, a band associated with each of said drums for engagement therewith, each of said bands having an operative connection to the associated transmission gear, intermeshing band tightening gears rotatable on said input shaft and said drum shaft and each having an operative connection to the associated band, an output gear mounted on said output shaft for rotation therewith and operatively engaging one of said transmission gears for being rotated thereby, and a control gear engaging one of said band tightening gears for alternative tightening of said bands against the associated drum thereby to rotate said output shaft in a coordinated direction.

2. A torque amplifier as set forth in claim 1, wherein said input and output shafts are identical.

3. A torque amplifier as set forth in claim 1, together with an enclosing housing having opposed side walls, each of said shafts extending between said side walls, and bearings carried by said side walls and journaling said shafts for rotation about parallel axes.

4. A torque amplifier as set forth in claim 3, wherein said input and output shafts are identical and extend beyond said side walls for attachment to drive and driven means, respectively.

5. A torque amplifier as set forth in claim 3, wherein said shafts and bearings have the same diameter, and wherein said housing has three identical bores through said side walls for receiving the same.

6. In a torque amplifier having a drum shaft and means for rotating the same about its axis, a drum mounted on said drum shaft for rotation therewith, an output shaft, a transmission gear rotatable on said drum shaft and operatively connected to said output shaft for rotating the same, a transversely generally flat band associated with said drum for engaging the same, a band tightening gear rotatable on said drum shaft, one end of said band being connected to said transmission gear and the other end of said band being connected to said band tightening gear, and control means for selectively rotating said band tightening gear to tighten said band against said drum and thereby cause rotation of said output shaft, one of said band ends having a swivel connection to the associated gear for rotation about an axis generally normal to said one band end and for limited rocking about the lengthwise axis of said one band end, thereby enabling said band to accommodate tightening and loosening relative to said drum.

7. A torque amplifier comprising, a drum shaft, means for rotating said drum shaft about its axis, a drum mounted on said drum shaft for rotation therewith, an output shaft, a transmission gear rotatable on said drum shaft and operatively connected to said output shaft for rotating the same, a band engageable with said drum, a band tightening gear carried by a hub rotatable on said drum shaft, said band being connected at one end to said transmission gear and at its other end to said hub, said hub being rotatable relative to said band tightening gear for selectively varying the clearance between said band and said drum, means releasably securing said band tightening gear in selected rotary position on said hub, and control means engaging said band tightening gear for rotating the same to tighten said band against said drum and thereby cause rotation of said output shaft.

8. In a torque amplifier having a drum shaft and means for rotating the same about its axis, a drum mounted on said drum shaft for rotation therewith, an output shaft, a transmission gear rotatable on said drum shaft and operatively connected to said output shaft for rotating the same, a band associated with said drum for engaging the same, a band tightening gear rotatable on said drum shaft, one end of said band being connected to said transmission gear and the other end of said band being connected to said band tightening gear, and control means for selectively rotating said band tightening gear to tighten said band against said drum and thereby cause rotation of said output shaft, wherein said band tightening gear is mounted on a hub rotatable on said drum shaft and secured to said other end of said band, said hub being rotatable relative to said tightening gear for selectively varying the clearance between said band and said drum, and means carried by said hub for releasably clamping said tightening gear and said hub in selected relative position.

9. A torque amplifier as set forth in claim 8, wherein said transmission gear carries releasable clamping means connecting said one end of said band thereto, said transmission hub clamping means providing a coarse band clearance varying means compared to the adjustment provided by said band-tightening gear on said hub.

10. A torque amplifier comprising, a drum shaft, means for rotating said drum shaft about its axis, a drum mounted on said drum shaft for rotation therewith, an output shaft, a transmission gear having a hub rotatable on said drum shaft, said transmission gear being operatively connected to said output shaft for rotating the same, a band associated with said drum for engaging the same, a band tightening gear rotatable on said drum shaft and connected to one end of said band, releasable clamping means connecting the other end of said band to said transmission gear hub and thereby providing means for adjusting the clearance between said band and said drum, and control means for rotating said band tightening gear to tighten said band against said drum and thereby cause rotation of said output shaft.

11. A torque amplifier as set forth in claim 10, wherein said other band end is swivelled on a tab which is releasably clamped by said releasable clamping means.

12. A torque amplifier comprising, an input power shaft, an output power shaft, a drum shaft, a drum mounted on said input shaft for rotation therewith, another drum mounted on said drum shaft for rotation therewith, input gears mounted on said input shaft and said drum shaft for rotation therewith, an idler gear meshing with said input gears whereby said drums are rotated in the same direction, intermeshing transmission gears rotatable on said input shaft and said drum shaft, a band associated with each of said drums for engagement therewith, each of said bands being connected to the associated transmission gear, intermeshing band tightening gears carried by hubs rotatable on said input shaft and said drum shaft, each of said hubs being connected to the associated band and being rotatable relative to its band tightening gear for varying the clearance between said bands and said drums, means releasably securing said band tightening gears in relative rotary position on said hubs, an output gear mounted on said output shaft for rotation therewith and engaging one of said transmission gears for being rotated thereby, and a control gear meshing with one of said band tightening gears for alternative tightening of said bands against said drums thereby causing rotation of said output shaft in a coordinated direction.

13. In a torque amplifier having a drum shaft and means for rotating the same about its axis, a drum mounted on said drum shaft for rotation therewith, an output shaft, a transmission gear rotatable on said drum shaft and operatively connected to said output shaft for rotating the same, a band associated with said drum for engaging the same, an annular band tightening gear rotatable on said drum shaft, one end of said band being connected to said transmission gear and the other end of said band being connected to said band tightening gear, and control means for selectively rotating said band tightening gear to tighten said band against said drum and thereby cause rotation of said output shaft, wherein said band tightening gear is mounted on a hub rotatable on said drum shaft and secured to said other end of said band, said hub being rotatable relative to said tightening gear for selectively varying the clearance between said band and said drum, and a clamping ring carried by said hub for releasably clamping said tightening gear and said hub in selected relative position.

References Cited by the Examiner

UNITED STATES PATENTS

| | | | |
|---|---|---|---|
| 2,569,585 | 10/51 | Small | 74—388 |
| 2,569,586 | 10/51 | Small | 74—388 |
| 2,585,507 | 2/52 | Small | 74—388 |
| 2,878,685 | 3/59 | Smith | 74—388 |

DON A. WAITE, *Primary Examiner.*